March 1, 1966  A. G. A. GRANT  3,237,292
METHOD OF AND MEANS FOR RESIZING PISTONS AND
LIKE HOLLOW ARTICLES
Filed Oct. 12, 1964  2 Sheets-Sheet 1

Alfred George Alexander Grant,
Inventor

By Wenderoth, Lind & Ponack,
Attorneys 3,237,292
METHOD OF AND MEANS FOR RESIZING PISTONS AND LIKE HOLLOW ARTICLES
Alfred George Alexander Grant, Canterbury, Victoria, Australia, assignor to Automaton Engineering Company Proprietary Limited, Melbourne, Victoria, Australia, a corporation of the Victorian Companies Act
Filed Oct. 12, 1964, Ser. No. 403,025
Claims priority, application Australia, Oct. 29, 1963, 37,005/63
4 Claims. (Cl. 29—401)

This invention relates to resizing pistons and other like hollow articles to compensate for wear, incorrect machining, or for any other reason.

The term "resizing" is understood, in the motor repair trade, to mean "making again to their original size" worn or otherwise undersized pistons and like hollow parts, to avoid replacing them with new parts.

There are a number of known ways of doing this, one of which is to peen the interior of the piston walls to cause expansion of the metal in that region and so increase the outside diameter.

It is the principal object of the invention to provide a simple method of performing this peening operation, and a mechanism for carrying out the method.

It is a subordinate object of the invention to provide a mechanism that can perform the peening operation on a plurality of pistons at one and the same time.

With these objects in view, the invention provides a method of resizing pistons, and like hollow articles, comprising the steps of temporarily attaching the piston to a pivoted arm, the piston containing loose harsh objects which are retained within the piston by removable cover secured on the open end of the piston, and oscillating the arm about its pivot so that the piston is oscillated along an arcuate path transverse of the piston, whereby the objects impinge on the inside surface of the piston wall with a peening action causing disturbance of the metallurgic structure of the wall resulting in enlargement of the piston diameter.

The invention also contemplates means for resizing pistons, and like hollow articles, comprising a pivoted arm adapted to be oscillated about its pivot by crank or like means, and means for mounting at least one piston on said arm so that upon oscillation of the arm the piston is oscillated along an arcuate path transverse of the piston, the piston containing loose harsh objects which are retained within the piston by a removable cover secured on the open end of the piston, whereby the objects impinge on the inside surface of the piston wall with a peening action causing disturbance of the metallurgic structure of the wall resulting in elargement of the piston diameter.

The harsh objects may be of any suitable hard material, such as metal, and may be of any convenient size and shape, preferably providing sharp corners.

The covers retaining the objects in the piston preferably have locating means and may be kept in place by rubber or like elastic bands.

One practical arrangement of the mechanism for carrying out the invention will now be described with reference to the accompany drawings in which.

Figure 1:
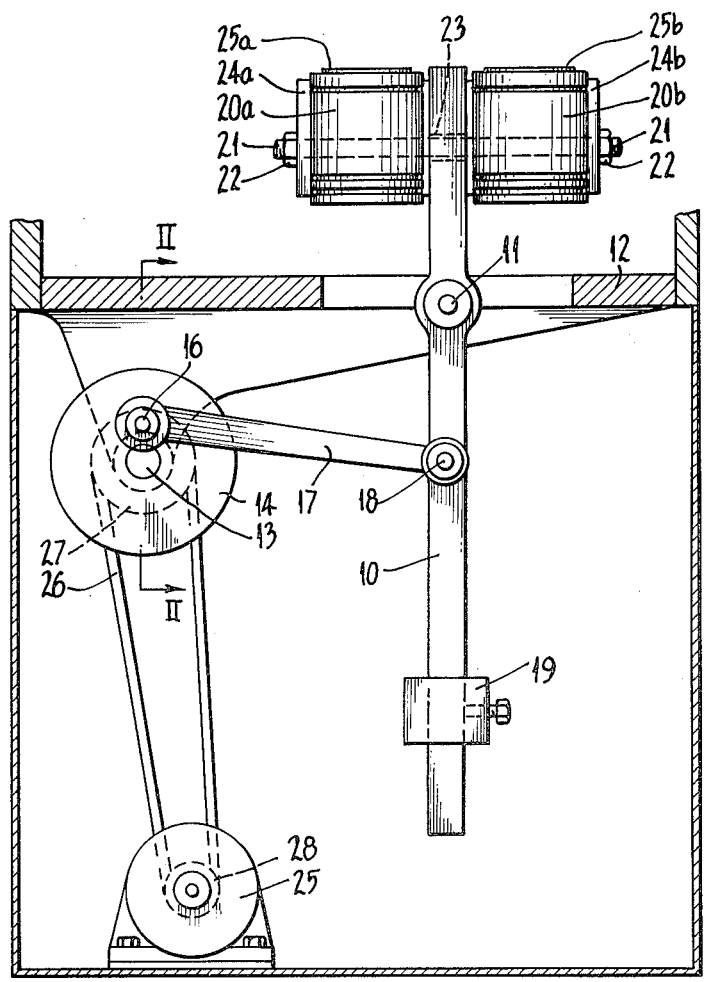
FIGURE 1 is a front elevation showing schematically the mechanism according to the invention.
Figure 2:
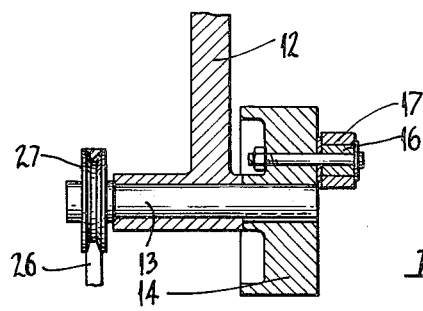
FIGURE 2 is a section taken on the line II—II of FIG. 1.
Figure 3:
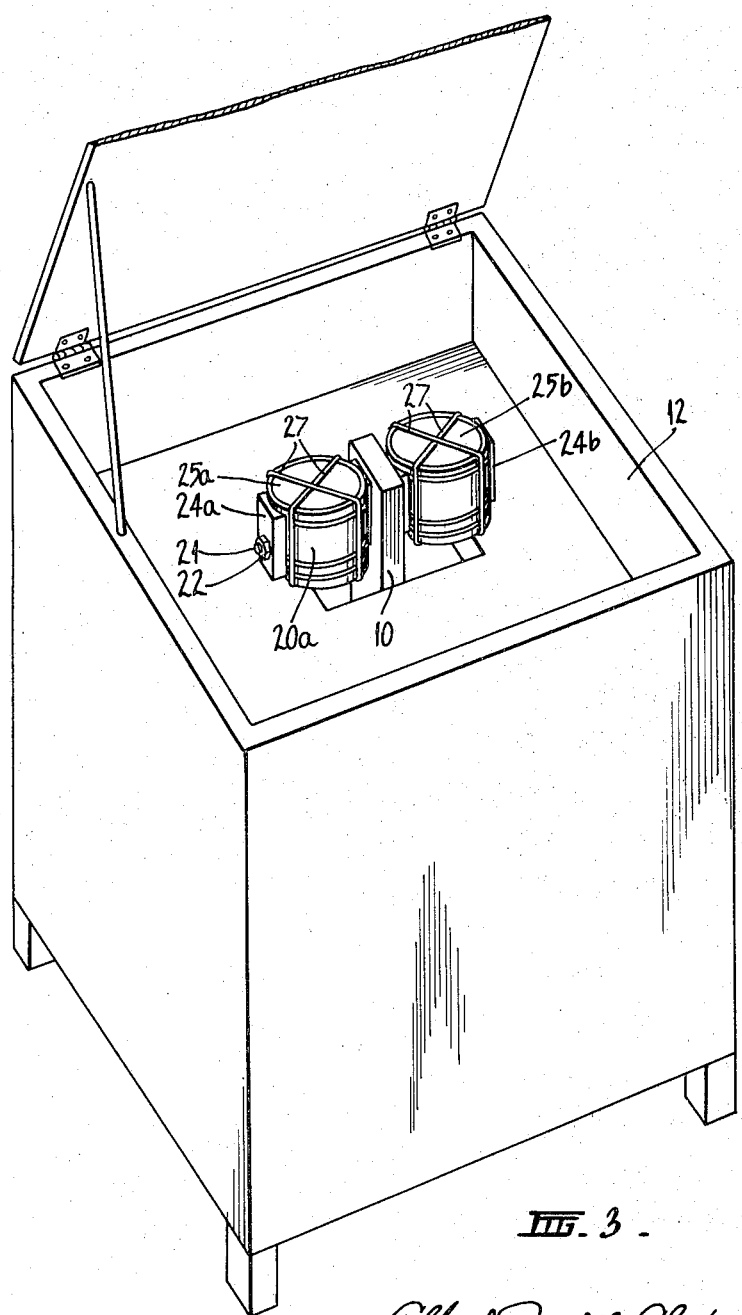
FIGURE 3 is a perspective view of the machine, mounted in a cabinet, as it appears in practice.

Referring to the drawings, the arm 10 is pivoted at 11 in a rigid frame 12, which frame also carries a power driven shaft 13 having a flywheel 14 fixed at one end thereof. One end of the arm 10 carries the pistons to be resized, indicated 20a, 20b. An eccentric pin 16 on the flywheel 14 drives the arm 10 by means of a connecting rod 17, which has its big end connected to the pin 16 and its small end connected to the arm 10 at 18, thus causing the arm to oscillate when the shaft 13 and flywheel 14 are rotated. An adjustable counterweight 19 may be provided on the arm 10 at the opposite end thereof to where the pistons 20a, 20b are held, whereby adjustments for balance may be made for varying weights of pistons. The flywheel 14 is suitably designed to balance the connecting rod 17 and eccentric pin 16.

Preferably two pistons are treated at a time, in which case a pair of pistons 20a, 20b are disposed one on each side of the arm 10 and temporarily secured thereto by a bolt 21 passed through the gudgeon pin holes of the pistons and through a hole 23 provided in the arm.

Mounted on the frame 12 is a power source, such as an electric motor 25, arranged to power drive the shaft 13 and flywheel 14, conveniently by means of V-belt 26 and belt pulleys 27 and 28 respectively. Any other suitable drive means may, of course, be employed.

In operation a pair of pistons 20a, 20b is secured to the upper end of the arm 10 by means of the bolt 21 and nuts 22, the open end of each piston facing upwards. Preferably, shaped washers 24a, 24b are interposed between the pistons and the nuts 22, such washers being curved on one side to correspond substantially to the curvature of piston exterior.

A number (for example, eight) sizing blocks, constituting the loose harsh objects are placed in each piston and retained therein by cover plates 25a, 25b. These cover plates 25a, 25b may be temporarily secured by any suitable means, such as by elastic bands 27. If only one piston is to be resized, another piston is placed on the other side of the arm 10 to balance it, but omitting the sizing blocks. The motor 25 is then energized and the arm 10 caused to oscillate, resulting in the pistons being oscillated along an arcuate path, whereby the sizing blocks impinge on the inside surfaces of the piston walls with a peening action.

In practice, the pistons are measured by micrometer before the machine is started and after running for a short time the machine is stopped and the pistons again measured, and so on until the required amount of increase in piston diameter is attained. In average cases an oscillation of one minute's duration results in an increase in diameter of .001 inch.

Preferably the sizing blocks are cubes of case-hardened mild steel or chilled iron measuring approximately $\frac{1}{2}'' \times \frac{1}{2}'' \times \frac{1}{2}''$.

It will be appreciated that, by appropriate dimensioning, the extent of the arcuate path traversed by the pistons can be varied, and by varying the speed of revolution of the shaft the speed of oscillation of the arm can be varied according to requirements.

Typical dimensions and data of a resizing machine according to the invention, given by way of example only and in no way limiting, are: radius of arc of piston oscillation at gudgeon pin hole=$4\frac{7}{8}''$; distance between pivot 11 and small end connection 18=$3\frac{1}{2}''$; eccentricity of pin 16 relative to axis of shaft 13=$\frac{15}{16}''$; approximate speed of rotation of shaft 13 and flywheel 14=700 r.p.m.

Details of the mechanism employed in the performance of the invention may, of course, be varied without departing from the generic concept of the invention as set forth in the claims which follow.

I claim:

1. A method of resizing pistons, and like hollow articles, comprising the steps of temporarily attaching the piston to a pivoted arm, the piston containing loose harsh objects which are retained within the piston by a removable cover secured on the open end of the piston, and oscillating the arm about its pivot so that the piston is oscillated along an arcuate path transverse of the piston, whereby the objects impinge on the inside surface of the piston wall with a peening action causing disturbance of the metallurgic structure of the wall resulting in enlargement of the piston diameter.

2. A machine for resizing pistons, and like hollow articles, comprising a pivotal arm adapted to be oscillated about its pivot by crank or like means, and means for mounting at least one piston on said arm so that upon oscillation of the arm the piston is oscillated along an arcuate path transverse of the piston, the piston containing loose harsh objects which are retained within the piston by a removable cover secured on the open end of the piston, whereby the objects impinge on the inside surface of the piston wall with a peening action causing disturbance of the metallurgic structure of the wall resulting in enlargement of the piston diameter.

3. A machnie according to claim 2, wherein the pivoted arm is disposed substantially vertically and supported in a rigid frame by a pivot located intermediate the ends of said arm, a pair of pistons is mounted on said arm at a point above said pivot one piston being secured on each side of said arm by a bolt passed through the gudgeon pin holes of the pistons and through a hole in the said arm, a motor is mounted in said frame, the crank or like means is supported for rotation in said frame and arranged to be driven by said motor, and a connecting rod connects said crank or like means with said pivoted arm at a point below said pivot so that upon energisation of said motor the arm is oscillated.

4. A machine according to claim 3, wherein the pistons are mounted on said arm with their open ends uppermost and the removable covers are secured thereon by rubber or like elastic bands.

References Cited by the Examiner
UNITED STATES PATENTS

| | | | |
|---|---|---|---|
| 2,032,020 | 2/1936 | Koether | 72—53 |
| 2,041,355 | 5/1936 | Koether | 72—53 |
| 2,661,643 | 12/1953 | Olson | 72—53 X |
| 2,984,895 | 5/1961 | Griffin et al. | 29—401 |

WHITMORE A. WILTZ, *Primary Examiner.*

THOMAS H. EAGER, *Examiner.*